US008505393B2

(12) United States Patent
Meyer

(10) Patent No.: US 8,505,393 B2
(45) Date of Patent: Aug. 13, 2013

(54) CRANKSET BASED BICYCLE POWER MEASUREMENT

(75) Inventor: James Isaac Meyer, Spearfish, SD (US)

(73) Assignee: SRAM, LLC, Chicago, IL (US)

( * ) Notice: Subject to any disclaimer, the term of this patent is extended or adjusted under 35 U.S.C. 154(b) by 22 days.

(21) Appl. No.: 13/252,740

(22) Filed: Oct. 4, 2011

(65) Prior Publication Data

US 2012/0017701 A1 Jan. 26, 2012

Related U.S. Application Data

(63) Continuation of application No. 11/935,891, filed on Nov. 6, 2007, now Pat. No. 8,065,926.

(60) Provisional application No. 60/864,431, filed on Nov. 6, 2006.

(51) Int. Cl.
*G01L 1/22* (2006.01)
*G01L 3/00* (2006.01)

(52) U.S. Cl.
USPC ............ 73/862.338; 73/862.325; 73/862.621; 73/862.627

(58) Field of Classification Search
USPC ......... 73/862.041–862.045, 862.08, 862.191, 73/862.627–862.629, 862.29, 862.31, 862.321, 73/862.338
See application file for complete search history.

(56) References Cited

U.S. PATENT DOCUMENTS

| | | | |
|---|---|---|---|
| 5,027,303 A | 6/1991 | Witte | |
| 5,560,266 A | 10/1996 | Shikimori et al. | |
| 5,766,106 A * | 6/1998 | Edwards | ........................ 474/160 |
| 5,767,404 A | 6/1998 | Kaiser et al. | |
| 5,894,094 A | 4/1999 | Kuchler et al. | |
| 5,900,703 A | 5/1999 | Li | |
| 6,038,933 A | 3/2000 | Meyer | |
| 6,173,801 B1 | 1/2001 | Kakutani et al. | |
| 6,418,797 B1 | 7/2002 | Ambrosina et al. | |
| 6,447,421 B1 | 9/2002 | Wren | |
| 6,487,932 B2 | 12/2002 | McLlraith | |
| 6,557,657 B2 | 5/2003 | Persson | |
| 6,935,157 B2 | 8/2005 | Miller | |
| 7,024,948 B2 | 4/2006 | Eilersen | |

(Continued)

FOREIGN PATENT DOCUMENTS

| | | |
|---|---|---|
| DE | 4208522 | 9/1993 |
| EP | 1154253 | 11/2001 |

*Primary Examiner* — Harshad R Patel
*Assistant Examiner* — Jonathan Dunlap
(74) *Attorney, Agent, or Firm* — Milan Milosevic; Lisa Serdynski; Steven Courtright

(57) ABSTRACT

The present application relates to an input torque measuring device for a drive train of a bicycle. The drive train includes a first crank arm and a second crank arm. An inboard end of each crank arm is rotatably mounted to the bicycle at a bottom bracket of the bicycle. At least one chain ring is configured to rotate a driven wheel of the bicycle. A spider is connected to the first crank arm adjacent the bottom bracket and extends out to the at least one chain ring. The spider is configured to transmit force applied to the crank arms directly to the at least one chain ring. The spider may include a plurality of sensors configured to respond to the force applied by the spider to the at least one chain ring. The sensors produce an electronic signal relative to the force transmitted by the spider to the at least one chain ring and a processor configured to receive the electronic signals from each sensor of the spider.

15 Claims, 5 Drawing Sheets

(56) References Cited

U.S. PATENT DOCUMENTS

| | | |
|---|---|---|
| 7,047,817 B2 | 5/2006 | Lanham |
| 7,240,586 B2 | 7/2007 | Wu |
| 7,975,561 B1 * | 7/2011 | Ambrosina et al. ..... 73/862.338 |
| 8,006,574 B2 * | 8/2011 | Meyer ....................... 73/862.627 |
| 8,065,926 B2 * | 11/2011 | Meyer ....................... 73/862.338 |
| 2005/0132820 A1 | 6/2005 | Eilersen |
| 2005/0178210 A1 | 8/2005 | Lanham |
| 2005/0282672 A1 | 12/2005 | Nonoshita |
| 2006/0037409 A1 | 2/2006 | Ichige |
| 2006/0082090 A1 | 4/2006 | Constans |
| 2009/0043534 A1 | 2/2009 | Prestidge et al. |
| 2009/0120210 A1 | 5/2009 | Phillips et al. |

* cited by examiner

CRANKSET BASED BICYCLE POWER MEASUREMENT

CROSS-REFERENCE TO RELATED APPLICATIONS

This application is a continuation of U.S. application Ser. No. 11/935,891 filed Nov. 6, 2007; and claims priority to U.S. provisional Application Ser. No. 60/864,431, filed on Nov. 6, 2006.

BACKGROUND

In the field of bicycle training and racing, a number of objective and subjective criteria may be used to judge to level and quality of a cyclist's performance in a particular event or training activity. These criteria may be used to determine or estimate the cyclist's overall ability or training level as well as the cyclist's ability with regard to specific aspects or types of exertion. These criteria may also be used to determine the degree to which that overall ability or specific aspects of ability were utilized in the event or training session. This information can then be used to tailor specific approaches to future events or training activities.

Since some of the criteria that may be used are subjective and may fluctuate based on a variety of factors that may or may not be apparent, it has become increasingly desirable, among cyclists, to focus on one or more objective performance measurements. One of these objective standards used may be the mechanical power generated by the cyclist that enables the bicycle to move forward. The speed at which the bicycle moves is dependent on a wide array of environmental factors and equipment characteristics. Thus, measuring the response to the power generated by the cyclist may not be representative of physical workload, as all of the external factors should be accounted for in some fashion.

By measuring the power generated directly, rather than the reaction to the power generated, a more objective measure of the level of effort exerted by the cyclist may be determined fairly quickly and easily.

Conventional power meters measure power in three primary ways: at the crankset, in the chain being moved by the crankset, or at the hub being driven by the chain. Measurements relying on the chain have been conventionally indirect and have generally been the least precise and accurate. Measurement at the driven hub can be quite accurate but the power measured represents the power generated by the cyclist minus any drive line losses that occur in the transmission of the power to the hub. In some cases, these losses may be significant and are dependent on a number of external factors, such as the length and quality of the chain, bearing losses, flexibility of the bicycle or components of the drive line, and other variables. These variables may change over time or based on the power being generated and transmitted. Thus, measuring power at the driven hub must also deal with external factors that may be unknown or too variable to accurately account for.

Conventional crankset power measurement systems but may include some inherent inaccuracies or operational issues that will be described below. Improvements to bicycle power measuring systems are desirable.

SUMMARY

The present application relates to an input torque measuring device for a drive train of a bicycle. The drive train includes a first crank arm and a second crank arm, each crank arm adapted to be engaged by a rider of the bicycle at an outboard end. An inboard end of each crank arm is rotatably mounted to the bicycle at a bottom bracket of the bicycle. At least one chain ring is configured to rotate a driven wheel of the bicycle. The measuring device may include a spider connected to the first crank arm adjacent the bottom bracket and extending out to and directly supporting the at least one chain ring. The spider is configured to transmit force applied to the crank arms directly to the at least one chain ring. The spider may include a plurality of sensors configured to respond to the force applied by the spider to the at least one chain ring. The sensors produce an electronic signal relative to the force transmitted by the spider to the at least one chain ring. The device further includes a processor configured to receive the electronic signals from each sensor of the spider.

The present application further relates to an input torque measuring device as described above with the spider including a plurality of spider arms extending out to and supporting the chain ring.

The present application further relates to an input torque measuring device for a drive train of a bicycle. The drive train includes a first crank arm and a second crank arm configured to be engaged by a rider of the bicycle at an outboard end. An inboard end of each crank arm is rotatably mounted to the bicycle at a bottom bracket of the bicycle. At least one chain ring is mechanically connected to the crank arms and configured to rotate a driven wheel of the bicycle. The measuring device may include at least one of the crank arms with at least one strain measurement device configured to generate an electronic signal when a force is applied to the crank arm. Circuitry may be configured to receive the electronic signal from the strain measurement device and including a processor configured to calculate the magnitude of the force applied to the crank arm from the signal generated by the strain measurement device.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DETAILED DESCRIPTION

Two different approaches to power meters or measuring devices incorporated into bicycle cranksets are described below. A first approach involves a system including gages integrated into the crankset "spider" (the portion of the crankset that connects the crank arm to the chain rings). A second approach involves a system that integrates gages into the crank arm.

A bicycle crankset as used in this disclosure refers to an assembly of opposing crank arms rotatably mounted to a bicycle via bottom bracket. A first side of the crankset includes a crank arm adapted to mount a pedal at an outer end and adapted for connection to the bottom bracket at the opposite end. This is typically the left crank arm.

Figure 1:
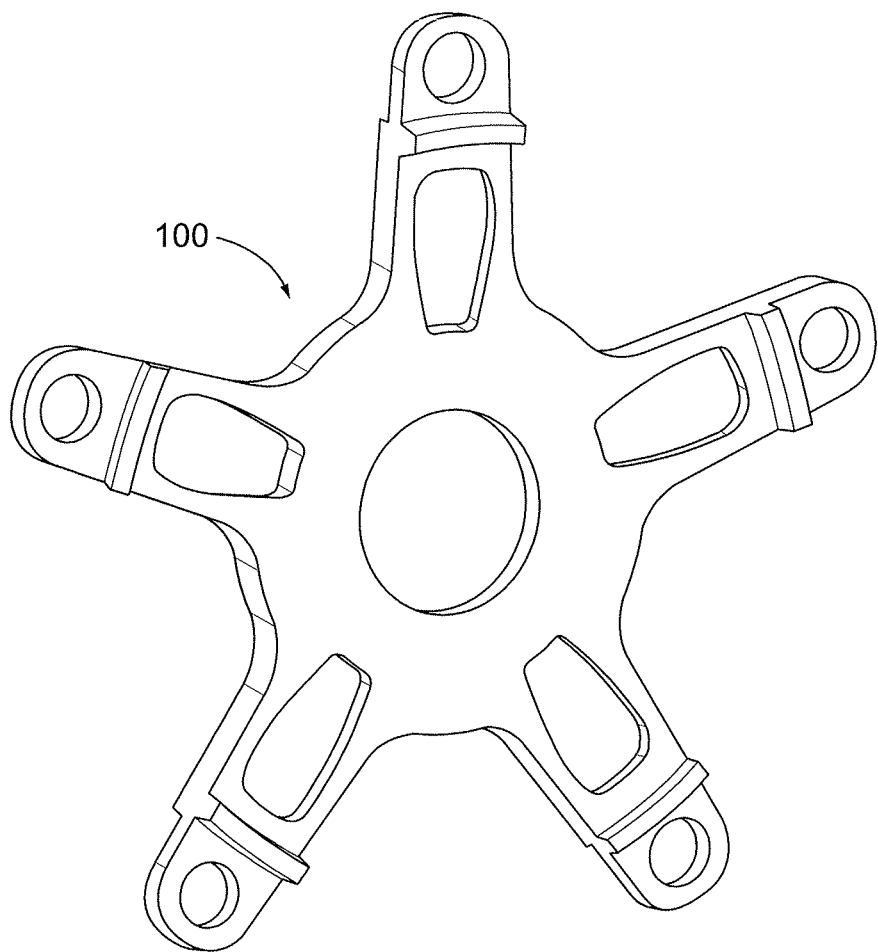
FIG. 1 is a perspective view of a bicycle crankset spider according to the present disclosure.

A second side of the crankset includes a crank arm which also is adapted to mount a pedal at the outer end and adapted for connection to the bottom bracket at an opposite end. The second side of the crankset may also include a spider 100, such as shown in FIG. 1, to which a chain ring may be mounted or which may have integral teeth for engaging a bicycle drive chain. A typical spider may have four or five spider arms, typically evenly spaced, with a chain ring mounted at an end of the spider arms and typically fixed in place, by a bolt in each spider arm. The spider may be rigidly connected to the crank arm of the second side. The chain and other drive line components are conventionally mounted to the right side of a bicycle.

The bottom bracket is typically configured to transmit rotation force exerted on the first side crank arm to the spider on the second side and to the drive chain. Thus, all force generated by a cyclist using this crankset will be applied to at least one of the crank arms and also transmitted through the spider to exert force on and move the drive chain.

According to the present disclosure, both approaches may calculate output power of a cyclist by measuring the torque load applied to the cranks and the crank angular velocity. Crank angular velocity can be easily measured with numerous sensors designs, whereas the applied torque load is somewhat more challenging. Both approaches described herein utilize a spring element integrated into the crankset that deforms a predictable amount under a given load, and a strain gage arrangement to measure the amount of deformation.

The Spider Approach

While pedaling, a cyclist is exerting a torque load between the chainrings and the crank arm. In the "spider" approach, each arm of the chainring spider may be instrumented with strain gages to measure the amount of deformation that occurs in each spider arm under load. There is also loading between the chain and the chainring, which is applied to the chainring in a local area at the top contact point (assuming a typical rear wheel driven bicycle arrangement, with the crankset mounted in front of the rear hub). Because the chain load is applied locally and the chainring may not be perfectly rigid, the bending load on each of the spider's arms may not be evenly distributed at any given point in time when the cyclist is applying force to the crankset.

Therefore, each of the spider's arms may desirably be instrumented. Because the spider arms are the only parts connecting the chainrings to the crank arm, the sum of the loading on the spider arms will yield the total loading between the crank arm and the chainrings. Note that there are several methods of summing the loads, including measuring each arm individually and summing in embedded software or summing electrically with a unique arrangement of the strain gages, as will be described later.

Alternatively, fewer than all of the spider arms may be instrumented and some form of algorithm may be used to calculate or interpolate the force or load exerted by the non-instrumented spider arms. The power generated by a cyclist may vary during pedaling and this variance may tend to be cyclical in nature about each rotation of the crankset. The nature of the peaks and valleys of force generated may be unique for each cyclist and these variations may make it difficult to estimate overall force or power generated with fewer than all of the spider arms instrumented. However, assumption as to a typical cyclist's cycle of power exerted may be used or specific parameters for each cyclist may be determined and used in the algorithm. To avoid using such algorithms and the necessary assumptions or prior analysis to calculate a derived power output, it may be more desirable though not necessary to provide gages on each of the spider arms of the crank.

Strain Gage Arrangement

In the spider approach described generally above, only the loads acting in the plane of the spider arms are preferably measured to calculate power. The chainline is almost never exactly in this plane, as the chain line varies depending on the gear selection and arrangement of components making up the drive line. This offsetting of the chainline may create a lateral load on the spider arm (in the axial direction of the bottom bracket). Additionally, the spider may carry multiple chainrings. The center planes of the chainrings are offset from each other and will be offset from the center plane of the spider. This may create a torque about the long axis of the spider arm.

Figure 2:
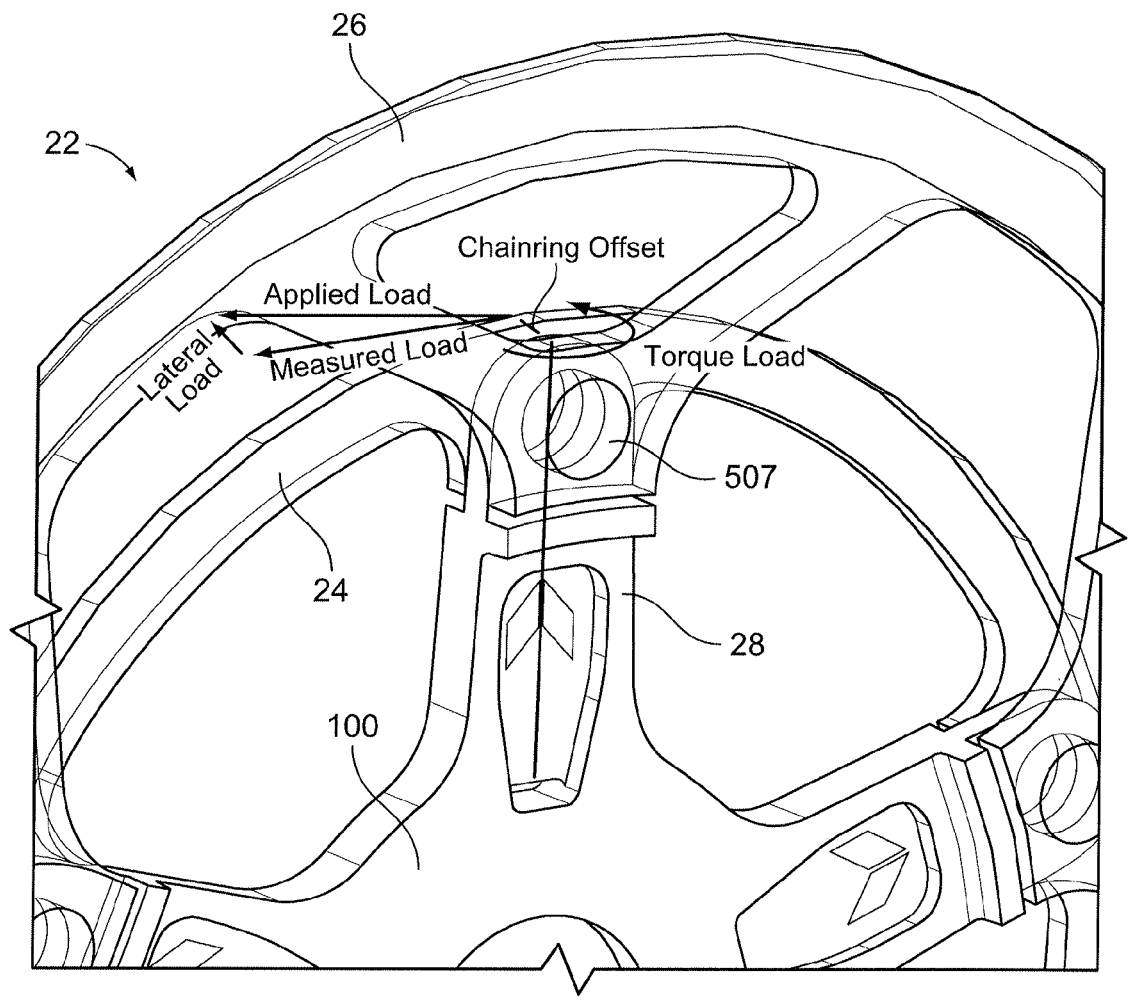
FIG. 2 is a spider and chainrings assembly according to the present disclosure including the spider of FIG. 1 and illustrated arrangement of loads applied to the inner chainring.

This arrangement of forces or loads is illustrated in FIG. 2. In FIG. 2, spider 100 in incorporated into a crankset 22 with an inner or small chain ring 24 and an outer or large chain ring 26. Both chain rings are connected to spider 100 at an outer end of a spider arm 28. In the illustrated force example, a chain is engaged with small chain ring 24 and an applied load is applied to the chain through spider 100. Because the chain may not pull perfectly in plane with chain ring 24, the applied force may be comprised of a lateral load and a normal load. Additionally, because chain ring 24 is offset laterally from spider arm 28, the applied load also creates a torque load as shown. Preferably, only the normal load is measured, as this is the mechanical force that generates forward of the bicycle. According to the present disclosure, strain gages should preferably not respond to either of the lateral load and torsion load.

As a background to the following discussion of strain gage locations, the following review of strain gage wiring and measurement methods is provided. Strain gages are basically resistors whose electrical resistance changes when mechanically distorted. The change in resistance is proportional to the change in length of the gage. In order to compensate for numerous other variables that can affect resistance, it is common to place strain gages in pairs such that under load, one gage is under compression (meaning the gage will be shortened, leading to less electrical resistance) and the other is under tension (meaning the gage will be lengthened, leading to more electrical resistance). The resistance of each gage in the pair may be measured and a ratio of the resistances of the paired gages can be determined with a suitable electrical circuitry.

Figure 3:
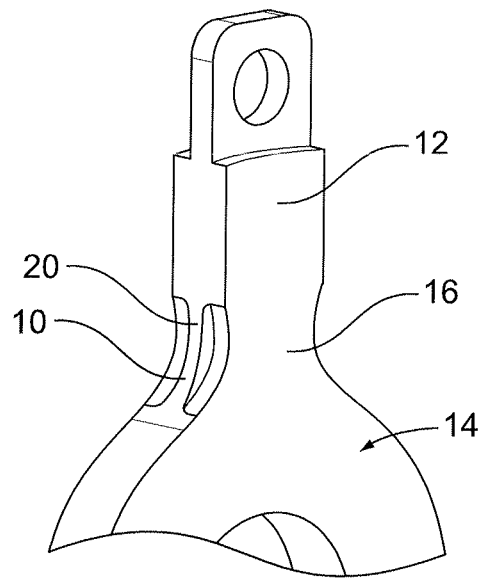
FIG. 3 is a perspective view of a first alternative embodiment of a spider arm of a bicycle crankset including laterally mounted strain gages according to the present disclosure.

The first arrangement is a tension/compression arrangement where a strain gage 10 is placed on each side of a spider arm 12 of a spider 14, as shown in FIG. 3. The strain gage may be located on a raised ridge 20 that concentrates strain under the gage.

This arrangement is fairly straightforward; chain tension in the plane of the spider will bend the arm, causing tension under one gage and compression under the other. The lateral load may be canceled out in each gage, because the neutral strain axis in this load case runs through the center of each gage, with compression on one half, and tension on the other. Overall the net effect on the gage resistance is generally zero. Also, the torsion load about the arm's axis is effectively cancelled out because it generally affects both gages equally and the result is generally zero when measuring the ratio of resistance between the gages. Therefore this opposed arrangement of strain gages achieves the desired measurement characteristics.

Symmetry may be desirable in the local area 16 between the placement of gage 10 in order to create this behavior. Similarly, the shape of arm 12 beyond the immediate local area 16 will preferably encourage good stress "flow" into the symmetrical area 16 between the gages 10 in order to enhance the performance of the gages. The performance and viability of this design has been verified through the use of finite element analysis.

Although conceptually sound, there are drawbacks to this design. Strain gages 10 are placed on an external surface that is vulnerable to damage and not readily protectable. Similarly, the location is not conducive to routing lead wires nor does it immediately lend itself to easy gage placement or construction.

Figure 4:
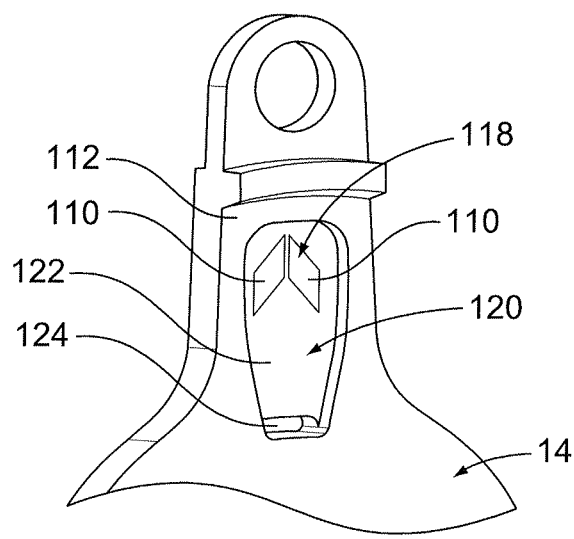
FIG. 4 is a perspective view of a second alternative embodiment of a spider arm of a bicycle crankset including shear web mounted strain gages according to the present disclosure.

A second strain gage arrangement is a shear web, as illustrated in FIG. 4. In this arrangement a shear gage 118 may be used. Shear strain gage 118 may utilize two strain gage grids 110 arranged at opposing 45 degree angles on a single gage substrate. When gage 118 is placed under shear strain, one grid 110 is compressed and the other grid 110 is stretched. In the shear web arrangement, a pocket 120 may be created on each side of a spider arm 112 of a spider 110, creating a thin web 122 of material between each gage. A pair of gages 118 may be placed on opposite sides of web 122 and a second pocket 120 may be formed in spider arm 112 opposite the first pocket 120 to contain a second gage 118 opposite the first gage 118.

Under chain load in the plane of the spider 112, this web 122 will see a shear strain. A shear strain gage 118 may be placed on both sides of the web 122. The gages 118 may be wired so that the two grid areas 110 (one of each gage 118 on opposite sides of web 122) under compression are in series with each other and the two grid areas 110 under tension are in series with each other. The resistance of strain gages in series will average the strain under each of the gages. Lateral loads on the spider arm may stretch and compress both left and right strain grids equally, and the effect on the ratio is generally zero. Also, torsion loads about the vertical axis of the arm may be essentially cancelled out, in this case, the right front and back left grids will see a tension, when the left front and right back are compressed, or vise versa. Again, due to the wiring arrangement, the net effect of this load on the resistance ratios may be essentially zero.

The function and performance of this gage arrangement of FIG. 4 has been verified both through finite element analysis and construction and testing of a physical prototype. Again, symmetry may be desirable about spider arm 112 to achieve the desired performance. Note that a slot 124 may be located at the bottom of the shear web. This slot 124 allows for routing lead wires from one side of the spider 114 to the other. The placement of this slot 124 and the material geometry between it and the strain gages 118 may be designed specifically to minimize the effect of the slot on the strain gage measurement.

The shear web arrangement of FIG. 4 may have several advantages in terms of packaging and construction. The strain gages 118 may be placed in the bottom of pocket 120, so that the pocket may enclose and protect the gage from five sides. Only the top is exposed, which can be covered by epoxy, wax, urethane, plastic, silicone or similar encapsulation material or other suitable mechanical cover, filling in pocket 120 atop the gage. The pocket 120 may be used create reference geometry which may be used to facilitate the accurate and repeatable placement of the strain gages 118 on spider 114. Also the gages 118 may be placed on the front and back of the spider, which introduces possibilities of integrating all the grid areas for all five arms onto one large substrate that can be affixed at once. This common substrate may improve overall production or cost efficiency.

As mentioned above, the total torque about the bottom bracket axis generated by the cyclist is equal to the sum of the torques that each arm carries. Also, in the above strain gage arrangements, the resultant strain is proportional to the applied torque. Therefore, the sum of the strains is proportional to the sum of the torques.

Depending on the construction of the electronics, each arm can be measured independently, and then the independent measurements can be added together by software to get the total torque.

Alternatively, the strain gages can be physically wired together such that one measurement can be taken that is proportional to the total torque. Specifically, all the grid areas on the left side of the spider arms may be wired in series with each other, and all the grid areas on the right side of the spider arms may be wired in series with each other. Then just one measurement may be taken and the ratio of all the lefts to all the rights is proportional to the total torque.

Numerous alternative wiring and measurement arrangements can also be conceived, including, but not limited to, pairing spider arms together, and measuring the front sides of the spider arms separately from back side of the spider arms. These variations on wiring and measurement arrangements may yield equivalent primary results, but each may posses distinct characteristics related to measurement resolution, repeatability, precision as well as fabrication and additional properties.

The Crank Arm Approach

The second approach described herein may include placement of a shear web strain gage arrangement in the crank arm of the crankset. An example of this approach is illustrated in FIGS. 5 and 6.

One of the challenges in executing input torque measurement in a crank arm is to isolate the input torque from the other forces acting on the arm. The input force from the cyclist's leg is applied to the pedal, which is cantilevered off the side of the crank arm. This creates a torque around a longitudinal axis of the crank arm. Unfortunately, the radius at which the load is applied is a function of the pedal design, cleat placement on the shoe and the biomechanics of the rider's pedal stroke. Likewise there are other forces acting laterally and longitudinally along the arm.

The shear web strain gage arrangement addresses these issues. The shear web arrangement operates similarly to the spider based system above, however in this case the shear web arrangement measures the strain from a location within the crank arm instead of the spider.

Figure 5:
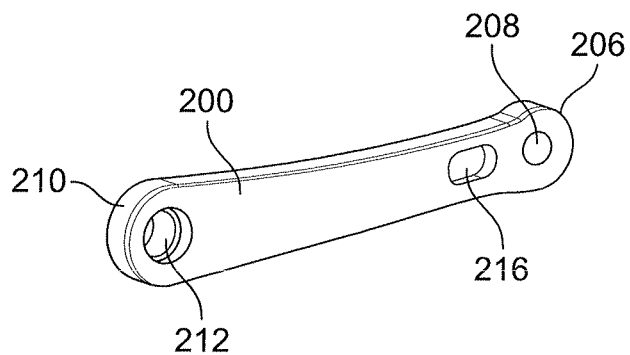
FIG. 5 is a perspective view of a crank arm of a bicycle crankset including shear web mounted strain gages according to the present disclosure.
Figure 6:
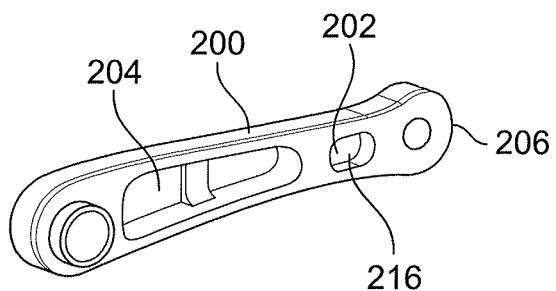
FIG. 6 is a second opposite view of the crank arm of FIG. 5.

Referring to FIGS. 5 and 6, a crank arm 200 may include a first end 206 with an opening 208 for mounted a pedal to the crank arm and a second opposite end 210 with an opening 212 for mounting crank arm 200 to a bottom bracket. A pocket 216 may be is machined into both front and back sides of crank arm 200 to create a thinned web section 202. A strain gage measurement grid such as gage 118 described above may be mounted within the pockets 216 and attached to the front and back faces of web 202. Each strain gage 118 may have two grids 110, oriented at approximately forty-five degrees to the longitudinal axis of crank arm 200, and generally ninety degrees from each other. The cross-sectional area between the gages (web 202) and in the surrounding local area of the arm is preferably symmetrical in order to create well-behaved linear responses to applied loads. Likewise the local area should be conducive to even stress flow into the strain gage section.

The creation of pockets 216 for gage placement is conducive to location and protection of the gages, but is not required for function. The gages may be placed on the external surface of the arm and the section between the gages may be hollow or otherwise modified from a thin web section provided the symmetry requirements are met.

Like the spider approach described above, this crank arm arrangement may allow the torque about the axis of rotation to be measured. Note that in this approach, the strain gage arrangement does not measure bending due to the applied load. Gage 118 instead measures shear. This allows the strain gages to be placed anywhere along the length of the crank arm. The amount of shear measured by gages 118 will be proportional to the load applied to the crank arm, regardless of where along the length of the crank arm the gages are placed.

In FIGS. 5 and 6, one possible configuration of crank arm 200 utilizing a shear web strain gage arrangement is illustrated. The electronics for sensing and recording the reaction of the mounted gages may be placed within a channel 204 on the back of the crank arm 200.

Figure 7:
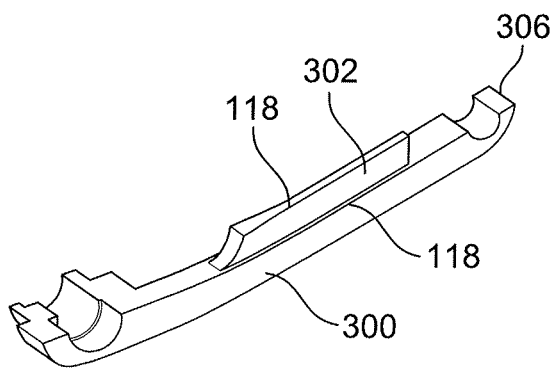
FIG. 7 is a perspective cross-sectional view of a first alternative embodiment of a crank arm of a bicycle crankset including internal shear web mounted strain gages according to the present disclosure.
Figure 8:
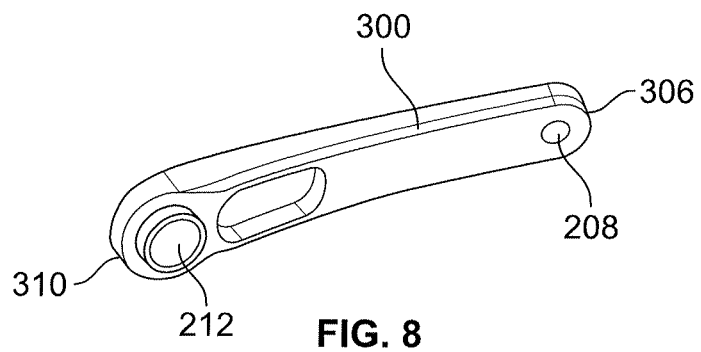
FIG. 8 is a second opposite perspective view of the crank arm of FIG. 7.

An alternative embodiment of a crank arm 300 according to the crank arm approach is shown in FIGS. 7 and 8. Crank arm 300 includes the two strain gages on the internal surface of a hollow crank arm. Although conceptually distinct from the shear web of crank arm 200, the execution is very similar. Two strain gages such as gages 118 are used, each having two strain grids oriented generally ninety degrees from each other and approximately forty-five degrees from a longitudinal axis of the crank arm.

FIGS. 7 and 8 show a possible design of crank arm 300 utilizing a dual internal shear gage arrangement. The electronics may be placed inside a hollow section 302 of the crank arm to provide good protection from the elements. Strain gages 118 may be placed adjacent to first end 306 where pedal mounting opening 208 is located. As described above, strain gages 118 could located at other locations along the length of crank arm 300.

Figure 9:
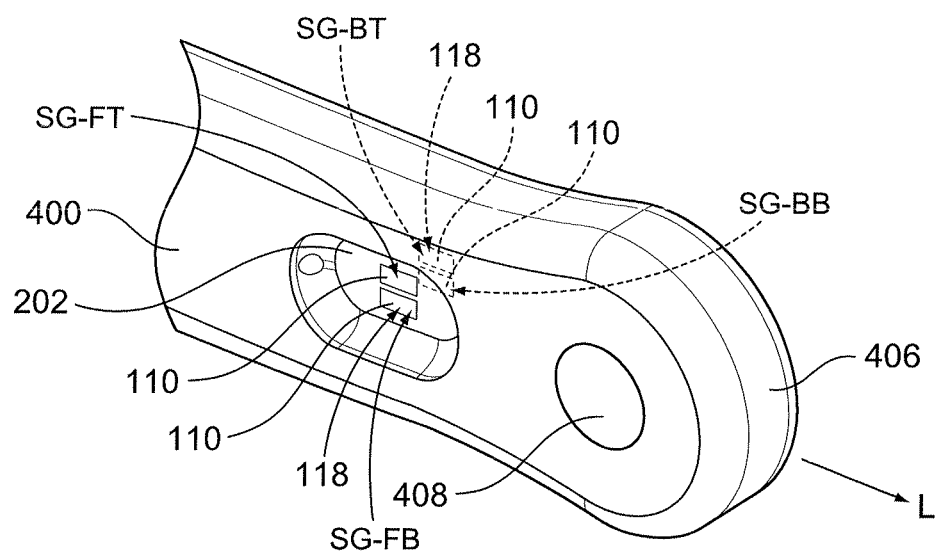
FIG. 9 is a perspective view of a pedal end of an alternative embodiment of a crank arm including shear web mounted strain gages according to the present disclosure.

The wiring and measurement of strain gages 118 mounted to any of the crank arms described above can be executed in much the same manner as the spider approach described above. However a few changes can be made that may greatly improve the accuracy of the measurement. In FIG. 9, a crank arm 400 includes a pair of opposing gages 118, each with two grids 110. The labeling the four strain gage grids are as follows: SG (Strain Gage)—F or B (front or back) and T or B (top or bottom).

In the case of crank arm 400, the primary load along the arm is torsion due to the torque placed about the longitudinal axis L of the arm. This creates shear on the front and back of the arm in opposite directions. Table 1 shows an example of average strain under each grid 110 as calculated by finite element analysis. The strain gage measurement electronics may measure the ratio of resistances of two strain gage grids. Ultimately the average shear strain of the two gages must be calculated. There are two primary methods that can be used to achieve this.

A first method is to measure the total strain of the front and rear grids independently with the measurement electronics then add them together to get the total. One advantage of this method is that the strain gage measurement electronics will measure higher strain levels, leading to greater accuracy and precision. However, two separate measurements must be made in this method.

A second method is to wire the top grids of the front and rear gages in series and likewise the bottom grids of the front and rear gages in series. The strain gage electronics then makes one measurement of the total effective strain. One advantage of this method is that only one measurement must be made, however the effective strain measured on each composite grid will be lower, which may reduce the precision and accuracy of the measurement.

TABLE 1

Design similar to FIG. 5, 1000 N load, 50 mm from crank arm face

|  | SG-FT | SG-FB | SG-BT | SG-BB | Back | Front | Total |
|---|---|---|---|---|---|---|---|
| Strain (ppm or µε) | −512 | 512 | 303 | −304 | −607 | 1024 | 417 |
|  |  |  |  |  | Top | Bot | Total |
|  |  |  |  |  | −209 | 209 | 417 |

Measuring the front and back gages independently may be preferable because making separate measurements can be easily executed with the electronics and will likely yield more accuracy and precision in the output.

In order to directly measure the total input torque, both the left and right crank arms may be instrumented as described above. The strain gages on each arm may be connected to a common set of measurement electronics via wires routed through the bottom bracket axle. Alternatively, each arm may have its own complete set of measurement electronics and may transmit the data to, for example, a handlebar mounted cycle computer that would sum the torque of the two arms. Such a cycle computer might be remotely mounted with a separate display mounted in the cyclist's view, or may be a fully integrated display and computer unit with the display mounted in the cyclist's field of view. The cycle computer would then be able to display the left vs. right power balance, and may also provide logging of the data for later review.

An alternative embodiment of a power measuring system according to the present disclosure might be to instrument only a single crank arm and measure the input torque from one leg only. This embodiment would not measure the total input torque from the rider but would extrapolate a total torque. Most riders apply output roughly equal torque with each leg, so under most conditions simply doubling the measured torque may give a good estimate of total torque. While the spider approach described above included electronics on only one side of the bike, the total torque input by the rider and transmitted to the chain was measured.

Although this single crank arm measurement embodiment might be less accurate than the spider based system described above, it may have several advantages. Namely, using a single instrumented crank arm requires replacing fewer parts of the bicycle and has only one set of electronics at the crankset.

In both the spider and crank arm based approaches, there are a number of electrical functions that may be executed. These functions and the design requirements for components to accomplish these functions may be similar between the two approaches.

There are a number of electronic functions that may be executed at the crankset. The strain gages may be connected to electronics to measure the resistance of the strain gages. The strain gage measurement components may then be connected to a microcontroller that controls all functions and manipulates the data. The microcontroller may then pass the data to RF transmission components. The RF components transmit the data to a computer mounted elsewhere on the bicycle, for example but not limited to the handlebar. Additional components may include hall-effect sensors or accelerometers for cadence measurement.

Alternatively, the microcontroller may be wired to the other components of the power measurement system. While wires may be vulnerable to damage, removing electrical components such as the RF components may reduce battery drain and improve reliability of the power measuring system.

Circuitry is also required to, power the electronics embedded on the spider or crank arm. This will likely be achieved with a small battery. The power consumption of the embedded electronics may be aggressively minimized in order to minimize battery size and weight and maximize battery life. Power reduction strategies may include changing the data transmission rate depending on the power level, i.e. at zero power no data is transmitted, at low power levels the data may be averaged over a several seconds, and at high power levels more data is transmitted.

Cadence is a component of the power calculation and can be measured with a variety a methods. One method is to use a hall-effect sensor(s) in the spider or crank arm and a magnet (s) affixed to the frame of the bike, such that the hall-effect sensor is tripped on each revolution. Multiple hall-effect sensors or magnets may be used to receive multiple pulses per revolution.

Alternatively, an accelerometer can be used to measure the direction of gravity relative to the orientation of the crank. This can be achieved through the use of a single or dual axis accelerometer. A single axis accelerometer will give the magnitude of the gravitational pull, alternating from +1 g to −1 g. A dual axis accelerometer measures acceleration in two directions perpendicular to each other, each alternating from +1 g to −1 g. Some basic calculations will yield the angle and angular velocity of the crank.

Two other methods of determining cadence look closely at the torque profile measured from the spider.

One method is to analyze a time based total spider torque profile. Due to the natural biomechanics of the pedaling action, there will be two distinct torque pulses as each leg passes through the 3 o'clock position and has maximum leverage. By identifying these torque peaks and measuring their frequency, pedaling cadence can be determined.

As this method of determining cadence is based on cyclist biomechanics, a similar approach may be applied to the torque profile determined by a crank arm approach. The crank arm should show the greatest torque applied by the cyclist at the 3 o'clock position and this peak should be distinct from the amplitude of the torque applied at any other position. Based on this, the spacing of the peak torque recorded by a crank arm gage may be used to derive cadence.

The other method involves looking at the torque on each spider arm individually. The spider arms closest to the chain contact point at the 12 o'clock position will show the greatest torque. By looking for this strain maximum on each spider arm individually it is possible to determine when each spider arm passes the chain contact point. The frequency will yield the pedaling cadence. Note that this method is not dependent on the rider's biomechanics.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. An input torque measuring device for a drive train of a bicycle having at least one chainring, comprising:
a spider directly connected to the at least one chainring, the spider configured to transmit force to the at least one chainring;
a plurality of sensors disposed on the spider, the plurality of sensors configured to respond to force applied to the spider and transmitted to the at least one chainring, the plurality of sensors configured to produce an electronic signal relative to the force transmitted by the spider, the plurality of sensors oriented to be generally parallel to a plane of the at least one chainring; and
an electronic circuit configured to receive the electronic signal and generate an output representative of the force transmitted by the spider parallel to the plane of the at least one chainring.

2. The input torque measuring device of claim 1, wherein the spider includes one or more arms.

3. The input torque measuring device of claim 2, wherein the plurality of sensors are distributed among the one or more arms.

4. The input torque measuring device of claim 2, wherein each of the one or more arms includes one of the plurality of sensors.

5. The input torque measuring device of claim 2, wherein each of the one or more arms is symmetrical about at least one axis.

6. The input torque measuring device of claim 2, wherein the one or more arms is directly connected to the chainring.

7. The input torque measuring device of claim 2, wherein each of the one or more arms has an outboard end, and the plurality of sensors are respectively positioned at the outboard ends.

8. The input torque measuring device of claim 2, wherein each of the one or more arms includes an opposed pair of sensors.

9. The input torque measuring device of claim 2, wherein each of the plurality of sensors is mounted to a shear web defined in each of the one or more arms.

10. The input torque measuring device of claim 9, wherein each shear web includes a pair of perpendicularly arranged strain grids mounted on opposite sides of the shear web.

11. The input torque measuring device of claim 10, wherein the shear web further includes an opening permitting electrical connection of the sensors on opposite sides of the shear web.

12. The input torque measuring device of claim 1, wherein a majority of the plurality of sensors are oriented parallel to a plane of the at least one chainring.

13. The input torque measuring device of claim 1, wherein all of the plurality of sensors are oriented parallel to a plane of the at least one chainring.

14. The input torque measuring device of claim 1, wherein each of the plurality of sensors responds to a deflection of a portion of the spider when the force is transmitted from the spider to the at least one chainring.

15. The input torque measuring device of claim 1 wherein each of the plurality of sensors further comprises a pair of strain grids, the strain grids of each pair oriented perpendicular to each other.

* * * * *